United States Patent
Barborini et al.

(10) Patent No.: US 11,398,374 B2
(45) Date of Patent: Jul. 26, 2022

(54) SAMPLE HOLDER FOR MASS SPECTROMETRY ANALYSIS IN MALDI MODE, PRODUCTION AND USE OF THE SAMPLE HOLDER

(71) Applicant: TETHIS S.P.A., Milan (IT)

(72) Inventors: Emanuele Barborini, Pizzighettone (IT); Simone Vinati, Bergamo (IT); Marc Henrik Baumann, Helsinki (FI)

(73) Assignee: TETHIS S.P.A., Milan (IT)

( * ) Notice: Subject to any disclaimer, the term of this patent is extended or adjusted under 35 U.S.C. 154(b) by 775 days.

(21) Appl. No.: 16/338,566

(22) PCT Filed: Oct. 4, 2017

(86) PCT No.: PCT/IB2017/056106
§ 371 (c)(1),
(2) Date: Apr. 2, 2019

(87) PCT Pub. No.: WO2018/065908
PCT Pub. Date: Apr. 12, 2018

(65) Prior Publication Data
US 2019/0252171 A1 Aug. 15, 2019

(30) Foreign Application Priority Data
Oct. 5, 2016 (IT) .................. 102016000099710

(51) Int. Cl.
- *H01J 49/04* (2006.01)
- *C01G 23/047* (2006.01)
- *H01J 49/16* (2006.01)
- *B82Y 30/00* (2011.01)

(52) U.S. Cl.
CPC ........ *H01J 49/0418* (2013.01); *C01G 23/047* (2013.01); *H01J 49/164* (2013.01); *B82Y 30/00* (2013.01)

(58) Field of Classification Search
None
See application file for complete search history.

(56) References Cited

U.S. PATENT DOCUMENTS

2006/0169917 A1 8/2006 Franz
2010/0248388 A1 9/2010 Liu et al.

OTHER PUBLICATIONS

International Search Report and Written Opinion dated Jan. 3, 2018 for corresponding PCT patent application No. PCT/IB2017/056000.
International Preliminary Report on Patentability, dated Mar. 9, 2018 for corresponding PCT patent application No. PCT/IB2017/056000.
Barborini et al.: Supersonic cluster beam deposition of nanostructured titania. E, Eur. Phys. J D, 2003 vol. 24, pp. 277-282.

(Continued)

*Primary Examiner* — Xiaoyun R Xu
(74) *Attorney, Agent, or Firm* — Abelman, Frayne & Schwab

(57) ABSTRACT

There are described a new type of sample holder for performing analyses of biological samples with mass spectrometry in MALDI mode, the process for its production and some protocols for the use of the sample holder in said technique. The sample holder, in its simplest embodiment (10), consists of a support (11) on a face (12) of which there is at least one porous deposit (13) consisting of nanoparticles of an oxide of a Group 4 metal.

12 Claims, 6 Drawing Sheets

(56) References Cited

OTHER PUBLICATIONS

Hidenori Nagai et al: Flexible manipulation of microfluids using optically regulated adsorption/desorption of hydrophobic materials Biosensors & Bioelectronics, 2007, vol. 22, pp. 1968-1973.
Wang et al.: Light-induced amphiphilic surfaces. Nature, 1997, vol. 388, pp. 431-432.
Yaotang Ke, et al.:Surface-modified TiO2 nanoparticles as affinity probes and as matrices for the rapid analysis of phosphopeptides and proteins in MALDI-TOF-MS. J.Sep.Sci, 2010, vol. 33, pp. 3400-3408.
Lewis W G et al.: Desorption/ionization on silicon (DIOS) mass spectrometry background and applications. International Journal of Mass Spectrometry, 2003, vol. 226, pp. 107-116.

SAMPLE HOLDER FOR MASS SPECTROMETRY ANALYSIS IN MALDI MODE, PRODUCTION AND USE OF THE SAMPLE HOLDER

CROSS REFERENCE TO RELATED APPLICATIONS

This application is a national phase of PCT application No. PCT/IB2017/056106, filed Oct. 4, 2017, which claims priority to IT patent application No. 102016000099710, filed Oct. 5, 2016, all of which are incorporated herein by reference thereto.

FIELD OF THE INVENTION

The present invention relates to a sample holder for carrying out mass spectrometry analysis in MALDI mode, in particular for biological samples; the invention also relates to the production of the sample holder and to its use in said technique.

PRIOR ART

The MALDI technique is an ionization technique used in mass spectrometry, in particular for the ionization of delicate samples, for example thermolabile and high molecular weight compounds, such as pharmaceutical compounds and in particular certain classes of biological molecules (biopolymers such as proteins, peptides and sugars), particularly fragile and prone to too rapid destruction with the conventional ionization techniques. The name MALDI is an acronym derived from Matrix-Assisted Laser Desorption/Ionization.

The technique consists in preparing a solution (in water or a mixture of water and an organic solvent) containing the compound to be analyzed (analyte) and the matrix material, generally an organic compound (glycerol, picolinic acid, succinic acid, caffeic acid, sinapic acid, etc.); depositing a drop of the solution on a sample holder; waiting (or causing) the evaporation of the solvent, which determines the crystallization of the matrix material and the co-crystallization of the analyte with the matrix itself; and finally irradiating the solid matrix containing the analyte with a laser pulse.

Following laser irradiation, there occurs the desorption of the analyte, which is released in a "clustered" form, that is, complexed with the matrix material, with the formation of a rarefied vapor phase which contains the two compounds. The matrix mitigates the effects of the laser beam, thus ensuring adequate protection to the analyte that is vaporized and ionized by the excess energy transferred secondarily by the matrix itself. "Quasimolecular", generally single charge, ions are thus obtained, such as those created by the acquisition or loss of a proton.

The part of the charge generated in the ionization and not transferred to the analyte is dissipated through the sample holder, which must be made (or have the surface covered) with a conductive material.

In addition to the well-established use for the analysis of individual molecules, the MALDI technique has recently been adopted in routine activities of microbiology laboratories for the identification of bacteria, and it is expected that in the near future it will be extended also to the analysis other biological entities (such as exosomes and microvesicles).

In addition, there is a variant of the technique, the so-called MALDI Imaging, by which it is possible to map the distribution of specific molecules in histological samples, for example for proteomic studies, in which it is desired to characterize the distribution of a protein within the tissue, or for pharmacokinetic studies, in which it is desired to characterize the distribution of an active ingredient (or one or more metabolites generated from it) within a histological sample obtained from a guinea pig organ previously subjected to pharmacological administration or perfusion.

For each of these applications, it is necessary that the sample to be analyzed be deposited on a suitable sample holder.

In the case of the analysis of molecular species, the sample holders generally used to date are non-disposable metal plates, commonly stainless steel. These plates do not possess structural elements of containment of the sample drop; notches are instead present, typically circular with a diameter of about 2 mm, whose function is to define areas to dispense the drop of the sample for easy identification thereof in the analysis phase, when the plate is inside the mass spectrometer. The metal plates have the problem that their wettability is not controlled, so that the drop of the initial solution is positioned and spreads in non-repeatable manner on its surface, often partly crossing the notch for the identification of the dispensing position, which virtually has no particular containment properties; the subsequent laser irradiation must therefore be carried out under careful visual inspection of an operator.

Due to the absence of containment structures and of the uncontrolled wettability, features that determine the uncontrolled behavior of the drop on the metal surface, the concentration of analyte per unit area, after evaporation of the solvent, it is not well-defined and in some points it may be somewhat reduced compared to what would occur if the drop of solution evaporated remaining within a well-defined initial perimeter on the sample holder. Finally, this leads to a dispersion in the peak intensities of the mass spectrometry measurements as a function of the point where the laser hits the surface and, when the drop is particularly enlarged on the surface, also a reduced sensitivity of the test.

It is also known that some samples, in particular biological, prior to analysis must be subjected to treatments such as washings to remove salt components and enzymatic digestions, for example treatments with trypsin in the case of protein samples, or acid treatments in the case of bacteria; in this regards, see for example the article "Formic acid-based direct, on-plate testing of yeast and *Corynebacterium* species by Bruker Biotyper matrix-assisted laser desorption ionization—time of flight mass spectrometry", by E. S. Theel et al., J. Clin. Microbiol. 2012, 50 (9), pages 3093-3095. These treatments are difficult, if not impossible, to carry out on steel sample holders, for example since treatments with acids corrode the surface thereof, leading to a sample contamination, or because the lack containment structures of the liquids would lead to further dispersion of the samples on the surface, with consequent further reduction of the analyte concentration per unit area, in addition to the additional risk of cross-contamination between next samples. Therefore, all of the necessary sample preparation treatments must be performed in advance, generally in vials and on the total volume of initial solution; this requires the use of larger quantities of reagents, and also exposes to the risk, well known to those skilled in the art, to lose part of the sample, for example by adhesion on the plastic hydrophobic walls of the vials, with possible alterations of the analysis results.

In order to overcome some of these problems, advanced sample holder for MALDI analysis of molecular species have been described in the literature, and in some cases are also available on the market.

The sample holder Bruker AnchorChip™ (described in U.S. Pat. No. 6,287,872 B1) is a stainless steel non-disposable plate on which a highly hydrophobic coating is present, apart from small areas (circular areas of diameter from 0.4 to 2 mm, called "anchors") in which the metal surface is accessible. This aims to increase the sensitivity of the test by inducing the concentration of the sample only on the hydrophilic areas. Since this sample holder is not disposable, it has certain limitations, such as the need for cleaning and the consequent risk of cross-contamination, the possible deterioration of the surface features due to inadequate reuse or storage, and especially the fact that the hydrophobic coating is incompatible with acid or basic treatments, and thus there are the same problems of inability to carry out treatments of the sample on the sample holder that occur with the simple steel plates; these issues are described in the user manual supplied with the product, available on the Internet at: http://www.rib.okayama-u.ac.jp/saka/MALDI-TOF/Images/AnchorChip%20Manual_2_0-1.pdf.

Patent application US 2004/0197921 A1 discloses a sample holder derived from an evolution of the AnchorChip™, in which the hydrophilic areas are surrounded by a ring of a hydrophobic material, but less hydrophobic than the plate coating. The purpose of the device is to exploit the capture of biomolecules on the ring by hydrophobic interaction, in order to perform the washing of possible water-soluble contaminants and subsequently proceed to the elution and concentration of biomolecules on the hydrophilic "anchors". However, since also this device is made of steel and is non-disposable, it has the same limitations already described for the AnchorChip™. Moreover, since the capture area (the hydrophobic ring) is different from the analysis area (the hydrophilic area), an elution step is required to detach the biomolecules from the ring and bring them to the hydrophilic area; in this operation, a part of the sample can be lost. These critical points are highlighted by the inventors themselves in paragraphs [0032], [0056] and [0066] of the cited patent application.

Patent application GB 2391066 A describes a further sample holder having a structure similar to that of the AnchorChip™, but made of plastic and disposable. In this device the hydrophilic "anchors" simply consist of a deposit, pre-produced on the plastic substrate, of the matrix material used in the MALDI technique. Being disposable, this sample holder does not have problems of degradation of its properties or cross-contamination in subsequent analyses. However, also this sample holder has a series of drawbacks: firstly, it virtually allows no treatment of the sample, since even a simple washing could remove the deposits of the matrix; furthermore, in the case of enzymatic digestion, for example with trypsin, the acid character of the matrix already present would inhibit the action of the enzyme which, as known to those skilled in the art, requires a basic environment at pH 7-9; moreover, the user cannot choose the matrix, this being pre-deposited; finally, the sample holder is constructed so as to prevent any re-use, so once disconnected from its support, it cannot be reattached and subjected to a new measurement, for example to confirm or integrate the results of a first analysis.

Other documents describe more complex sample holders.

Patent application US 2014/0308728 A1 describes the functionalization of surface areas (the anchors) of the sample holder with titanium oxide nanotubes. U.S. Pat. No. 8,598,511 B1 discloses a similar sample holder, in which the anchors are made of carbon nanotubes, grown locally after having selectively deposited on the surface layers of a catalyst for the growth of these nanotubes (such as nickel). U.S. Pat. No. 8,294,090 B1 describes a sample holder with anchor points made of metal (in particular, platinum or gold) or with hydrophobic polymers such as polystyrene, polyethylene or polypropylene; this sample holder is specifically designed, and only suitable for, the MALDI analysis of nucleic acids or proteins. Finally, patent application WO 2012/115380 A2 discloses a metal sample holder with anchor points of the sample made with nanowires of metal oxides. These sample holders are in general of complex production, and some are made with a metal plate, thus having the problem described above of inability of in situ treatment of the sample.

Patent application US 2010/0248388 A1 describes a sample holder for MALDI analysis consisting of a conductive support on which a plurality of deposits of a porous oxide is present ("sorbing phase"; the deposits are generally arranged according to an ordered geometry). The porous deposit is obtained by sintering of nanoparticles, and is capable of absorbing a sample of a proteinaceous nature and of selectively binding the component of phosphorylated peptides or other components, after appropriate functionalization of the nanoparticles constituting the porous deposit. Even though the described sample holder allows the selective capture of components of biological samples within the deposits, it does not possess any ability of containment of the drops on the same and therefore requires appropriate liquid containment structures ("fluidic device", paragraphs [0037] and [0039]) for the execution of all the treatments described. In this regard, see in particular the description of paragraph [0037], made with reference to FIG. 2, in which it is said that "A cylinder 6 fitted to the tip is used as a reservoir to hold the depleted sample solution 7" (the aforementioned tip is that of the dispenser element of the solution).

In general, external containment structures are always required to promote the interaction between a sample in a liquid phase and a functionalized surface. In this regard, for example, patent application US 2011/0281267 A1 shows various external fluidic configurations designed to facilitate the interaction of a cytological sample with a functionalized surface for cell adhesion (FIGS. 1, 3, 4 and 5); while, for example, patent application US 2006/0169917 A1 clearly shows a containment element in FIG. 1, although not mentioned in the text.

As regards the analysis of bacteria, "dedicated" sample holders have been developed which are specialized, in size and shape, to be used exclusively with a particular mass spectrometer. Today's most popular instruments on the market are BioMerieux VITEK® MS and Bruker Biotyper. Sample holders for use with the first of these instruments are simple disposable platforms of conductive plastic with a thin coating of stainless steel. Sample holders for use with the Bruker spectrometer are silicon or stainless steel plates. None of these sample holders is designed for the treatment of the biological sample, that is, none of these sample holders has features such as to allow the absorption, the selective capture or any type of generic capture of the biological sample; moreover, none of these sample holders has liquid containment elements, although in some cases a suitable treatment of the sample could help, for example, in the identification of specific bacterial strains as reported, for example, in the aforementioned publication by E. S. Theel et al.

The sample holders currently available are also problematic to use in the MALDI Imaging technique (or IMS, "Imaging Mass Spectrometry"). In this technique, the laser pulses are emitted according to a suitable geometrical pattern, typically Cartesian with distances between the irradiation points of between 10 and 200 µm, in order to perform a scan of the histological sample subjected to analysis and acquire a mass spectrum for each point; the aim is to generate, as a result, false color maps of tissue which represent the spatial distribution of a given mass (therefore, a specific chemical species). The sample holders currently available are generally glass plates ("slides") with a surface covered by a transparent conductive film of a mixed indium and tin oxide (commonly referred to as ITO, Indium Tin Oxide). In MALDI Imaging, therefore, the sample, prepared at the cryo-microtome, is placed on the slide and, after having induced the adhesion thereof by simple thawing, it is treated with chemicals in liquid phase to carry out, for example, the dehydration, fixation and delipidation thereof. A problem encountered with these sample holders is that during treatments with liquids, some tissue sections can move, fold back on themselves or overlap with other tissue sections possibly present on the same sample holder, thus preventing analysis. This occurs due to the interference on the tissue-slide adhesion by the chemical compounds used for the treatment of the tissue, with which the tissue itself has a greater affinity. A further limitation concerns the removal (carried out by chemical means, for example by means of methanol solutions) of the MALDI matrix for subsequent analyses on the same sample (e.g., by immunostaining): also in this case, the solution for the removal of the MALDI matrix interferes with the slide-tissue adhesion, causing the detachment, and therefore the loss, of the histological sample.

In addition to the limitations identified above for the various types of sample holders, another problem of the art consists precisely in the fact that a sample holder different in shape and size is required for each type of analysis, or even for each instrument.

The object of the present invention is to provide a sample holder that overcomes the drawbacks of the sample holders currently known or in use.

SUMMARY OF THE INVENTION

This object is achieved with the present invention, which in a first aspect thereof relates to a sample holder for use in the MALDI technique, comprising:
a support, selected from:
  a) a support consisting of a non-metallic, antistatic and hydrophobic material, having a volume resistivity lower than $10^{12} \Omega \times cm$ and a contact angle in a water wettability measurement at least equal to 90°;
  or
  b) a support having at least one face covered with a layer of a non-metallic, antistatic and hydrophobic material, having a surface resistivity lower than 10 $k\Omega \times square$ and a contact angle in a water wettability measurement at least equal to 90°;
on a face of the support in case a) or on said covered face in case b), one or more deposits of an oxide of a metal of Group 4 of the periodic table of the elements, having a thickness between 100 and 400 nm and consisting of nanoparticles of said oxide having size between 2 and 50 nm, said one or more deposits entirely surrounded by the material of the support in case a) or by the material of said layer in case b);

wherein said one or more oxide deposits are obtained by ballistic growth from said nanoparticles and have a self-affine structure, which has a porosity hierarchy from one nanometer to one hundred of nanometers;
and wherein the surface of the sample holder on which there are said one or more oxide deposits is treated with UV radiation in such a way that the deposits show a contact angle smaller than 5° to a water wettability measurement while the same treatment with UV radiation does not alter the hydrophobicity of the support in case a) or of the material of said layer in case b).

Preferably, the sample holder of the invention has a plurality of said deposits, arranged on said face of the support with a regular geometric arrangement.

In a second aspect thereof, the invention relates to the process for producing such a sample holder.

DETAILED DESCRIPTION OF THE INVENTION

The invention is described hereinafter in detail with reference to the Figures.

In the figures, the same number corresponds to a same element; also, for clarity of representation, the elements shown are not necessarily to scale.

The sample holder of the invention consists of a support formed by, or having at least one face coated with, a non-metallic antistatic and hydrophobic material, where the term hydrophobic means the characteristic of a surface on which a contact angle measurement made with water provides a value equal to or greater than 90°.

Figure 1A:
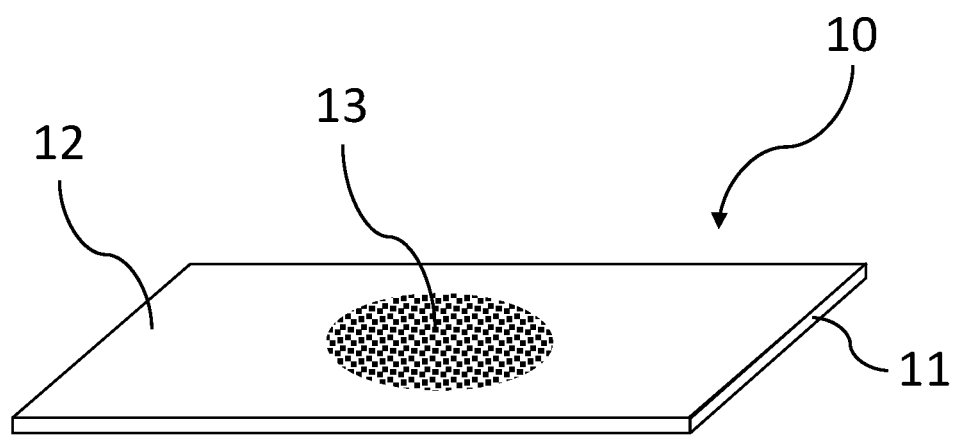
FIGS. 1a and 1b show two possible alternative embodiments of sample holders of the invention.

The first possibility (case a, support consisting of non-metallic material with a volume resistivity lower than $10^{12} \Omega \times cm$) is represented in FIG. 1a, in which the sample holder, 10, consists of a support, 11, made entirely with said non-metallic antistatic and hydrophobic material. On one face, 12, of support 11, there is a deposit, 13, of a Group 4 metal oxide consisting of nanoparticles.

Figure 1B:
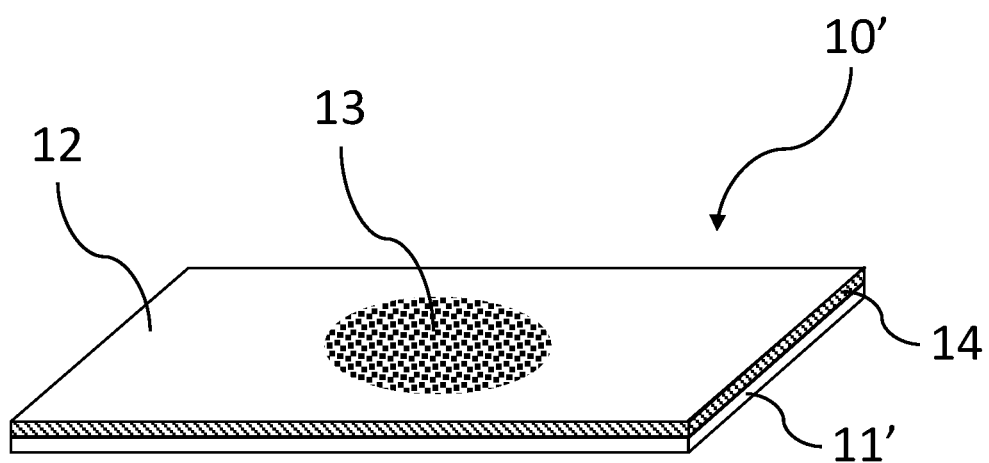

The second possibility (case b, support with a face covered with a layer of a non-metallic material with a surface resistivity lower than 10 $k\Omega \times square$) is represented in FIG. 1b; in this case, the sample holder of the invention, 10', consists of a support, 11', having a face covered with a layer 14 of non-metallic antistatic and hydrophobic material. On the exposed face 12 of layer 14, here is the deposit 13 of oxide nanoparticles.

In the sample holder 10, the support 11 may be made, for example, with a polymeric material (such as polypropylene, polyethylene, polystyrene, poly(methyl methacrylate) or polycarbonate) filled with conductive material powders, such as graphitic carbon; alternatively, support 11 may be made of doped silicon.

In the case of the sample holder 10', support 11' may be made with any material that has mechanical properties suitable for the purpose, and which allows the adhesion of layer 14 (for example, it may be made of glass, plastic or metal); layer 14 may be made with one of the materials mentioned above for the production of support 11, or with a conductive oxide, such as for example the mixed indium and tin oxide (ITO).

The preferred materials for making support 10' are polymers (for example, polypropylene, polyethylene, polystyrene, poly(methyl methacrylate), polycarbonate) charged with graphite powder, or glass slides with a face covered with ITO.

The dimensions of the support may vary within wide limits, but they are suitably similar to those of the slides already employed in routine analyses, either automated or not, in the medical and biological field, to allow the management (handling, storage) of the sample holder of the invention in standard operating modes, including the use of automated means and instrumentation already employed in the sector also for analyses other than MALDI; for example, a typical sample holder of the invention may have lateral dimensions of 25×75 mm and a thickness of 1 mm, standard values of common glass slides.

On one of the main faces of support 11, or on the exposed face of layer 14, there is at least one porous deposit 13 of an oxide of a Group 4 metal, preferably titanium and zirconium, entirely surrounded by the material of support 11 or of layer 14.

Figure 2:
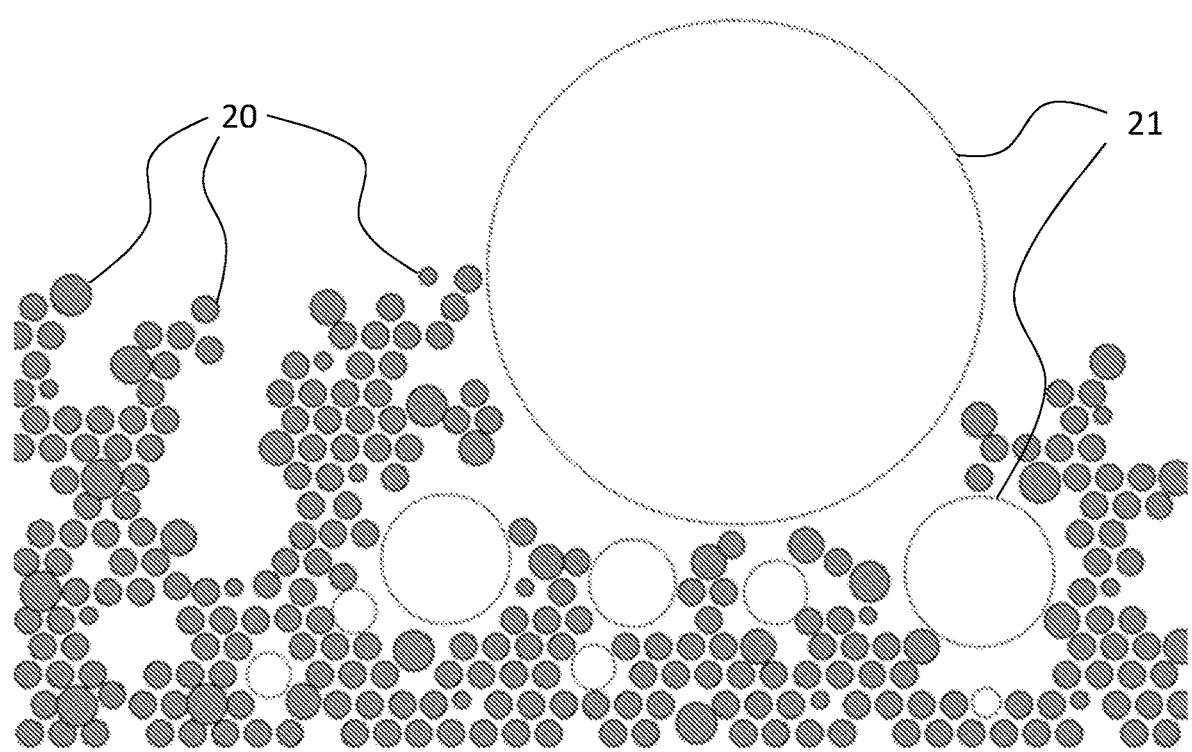
FIG. 2 shows a schematic representation of the microscopic structure of a metallic oxide deposit of a sample holder of the invention.

The deposit (the production of which is described below) is formed by particles of said oxide having a size of between about 2 nm and 50 nm, with a maximum of the particle-size distribution curve of the same in the range between 5 and 15 nm. Moreover, the deposit has a thickness of between about 100 and 400 nm, and preferably between about 150 and 300 nm. The porosity of the deposit is a consequence of a growth mode of the deposit itself due to the "ballistic" model, in which the flying nanoparticles stop at the exact point at which they impact on the substrate or on the nanoparticles already deposited, without diffusion or rearrangements. Due to the ballistic growth mode and to the thickness values indicated above, the deposit has within certain limits a self-affine or more generically fractal structure. Self-affinity consists in that the three-dimensional geometry (or a two-dimensional section thereof) of the oxide deposit always appears similar to itself even when observed at different magnifications, in which details of different sizes are displayed at the same apparent size for some orders of magnitude; for a confirmation of the self-affine nature of these deposits, see for example articles "Self-affine properties of cluster-assembled carbon thin films", R. Buzio et al., Surface Science 444 (2000), and "Nanomanufacturing of titania interfaces with controlled structural and functional properties by supersonic cluster beam deposition", A. Podesta et al., Journal of Applied Physics 118 (2015). In the particular case of the oxide deposits of the present invention, there is a self-affine porous structure characterized by a porosity hierarchy, of a size from one nanometer to one hundred of nanometers. This situation is schematized in FIG. 2, which shows a series of particles 20 of different sizes, assembled in ballistic mode to form a deposit on a support (not shown in the figure); reference numeral 21 shows by way of example, represented by dashed circles, some empty spaces of different sizes representing in a schematic manner the hierarchical structure of porosity observed in the deposit and due to the ballistic growth mode of deposit 13. In particular, the subject porous structure is characterized in that conditions for the nucleation of proteins and biomolecules in general are determined inside the pores and this allows a particularly effective capture of the biomolecules themselves in amounts that exceed what is expected by the geometric increase of the specific surface area, as described in articles "The effect of surface nanometrescale morphology on protein adsorption", P. E. Scopelliti et al., PLoS One 5(7), e11862 (2010); and "Nanoscale roughness affects the activity of enzymes adsorbed on cluster-assembled titania films", L. Gailite et al., Langmuir 30(20), 5973-5981 (2014).

Due to the size distribution of the nanoparticles, of between about 2 and 50 nm, and centered between 5 and 15 nm, the deposit surface has a minimum peculiar roughness, related to this distribution, and independent from the level of development of the hierarchical structure of the porosity.

The preferred material for making deposit 13 is titanium oxide, $TiO_2$.

This oxide has the peculiar feature of being able to be made super-hydrophilic as a result of UV irradiation, as initially described in article "Light-induced amphiphilic surfaces", R. Wang et al., Nature 388,431 (1997). The term super-hydrophilic, in the present invention, refers to the feature of a surface on which a contact angle measurement made with water provides a value equal to or smaller than 5°. A possible explanation of this phenomenon is given in article "$TiO_2$ photocatalysis: A Historical Overview and Future Prospects", K. Hashimoto et al., Japanese Journal of Applied Physics 44(12), 8269-8285 (2005); the feature described in the article by Hashimoto et al. for $TiO_2$ is also found in zirconia, $ZrO_2$, as shown in article "Light-Controlled $ZrO_2$ Surface Hydrophilicity", Rudakova A. V. et al., Scientific Reports 6, 34285 (2016).

Unlike other processes for the treatment of surfaces such as, for example, exposure to an oxygen plasma (as described for example in paragraph [0060] of patent application US 2011/0281267 A1, assigned to the present Applicant), which has the known effect of inducing hydrophilicity indistinctly on different materials exposed to it, including polymeric materials, UV irradiation was observed to have no effect on the original hydrophobicity of the support.

If on the one hand the original hydrophobicity of the support is not altered by UV radiation, it is known however that UV radiation can also cause photo-desorption of volatile compounds from polymeric materials. These compounds can re-settle on the surfaces arranged in the vicinity of the irradiated polymeric material, causing a substantial modification of the wettability thereof: in particular, originally hydrophilic surfaces, arranged in the vicinity of polymeric materials, can be made hydrophobic through this mechanism. The phenomenon is clearly described, for example, in the article Nagai H. et al. "Flexible manipulation of microfluids using optically regulated adsorption/desorption of hydrophobic materials", Biosensors and Bioelectronics 22, 1968-1973 (2007), where it is used to make a hydrophilic $TiO_2$ surface hydrophobic.

Surprisingly, the inventors have observed that such a photo-desorption process of volatile compounds and consequent induction of hydrophobicity of the surfaces in the vicinity of the irradiated polymer does not occur in the case of polymers such as polypropylene, poly(methyl methacrylate), polycarbonate and other similar non-elastomeric polymers. In particular, the inventors have unexpectedly observed that areas of $TiO_2$ very limited in size (1 mm diameter dots) deposited on the polymers mentioned above and completely surrounded by them, when subjected to UV irradiation do not acquire any feature of hydrophobicity as a result of photo-desorption of volatile compounds from the surrounding polymer, and conversely become super-hydrophilic.

Therefore, the UV radiation can be advantageously exploited to make the porous deposits of oxides of Group 4 metals super-hydrophilic and at the same time not affect the hydrophobic character of the support. This leads to the remarkable result of generating a strong hydrophilic-hydrophobic discontinuity in the properties of wettability of the sample holder surface, and in particular at the edge of the porous oxide deposit. The hydrophilic-hydrophobic barrier therefore acts as a containment structure for drops of liquid and allows the in situ treatment of biological samples without the aid of external physical containment structures.

The UV treatment of the sample holder can conveniently and easily be carried out by operator of the MALDI analysis, before using the sample holder, by irradiation for at least half an hour by means of a 30 W power UV lamp, kept at a distance of about 40 cm from the sample holder of the invention. It is noted that a radiation such as that described herein is easily obtainable within a chemical hood aspirated and equipped with a UV lamp sterilizer, commonly available in any biology laboratory. In the case of aspirated hoods with UV lamps of different power, it is always possible to suitably rescale distance and time to easily obtain the described irradiation.

While the sample holder of the invention has been described thus far as having a single deposit 13, it will be apparent to those skilled in the art that in the preferred embodiment thereof, this will have a plurality of type 13 deposits; this configuration allows multiple treatments and parallel analysis of similar samples to be carried out, or to repeat treatments and analyses on multiple fractions of the same sample in order to improve the reliability of the results.

The deposit (or deposits) 13 are preferably circular in shape, and have a diameter between 1 and 3 mm.

Figure 3:
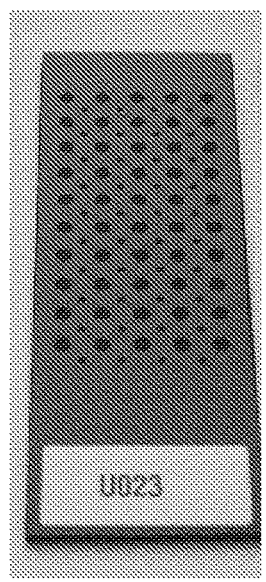
FIG. 3 shows a photograph of a sample holder of the invention in a preferred embodiment.

When on the sample there are multiple type 13 deposits, these are normally in an ordered geometric arrangement, and preferably centered at the nodes of a square lattice, whose spacing corresponds to the standard adopted in the sample holders used in other analyses in the biomedical field, such as "multiwell" plates, and facilitates the integration of MALDI analysis in the typical operational sequences of the field. FIG. 3 shows a photograph of a sample holder with multiple deposits 13 according to this preferred embodiment; the sample holder in the photograph was produced from a plastic support loaded with graphite, but of course sample holders with multiple type 13 deposits may be produced both with supports with the simple structure shown in FIG. 1a, and with supports with a coated face of the type shown in FIG. 1b.

The sample holder may also have, on the same face on which there are deposits 13, different deposits, for example, for the positioning on the sample holder of internal calibration standards of the analysis. These different deposits may be located on nodes of the above lattice (for example square), at points where type 13 deposits have not been produced.

In a second aspect thereof, the invention relates to the method for producing the sample holders described above.

The supports for the production of the sample holder are commercially available or easy to produce; in particular, of common commercial availability are supports made of plastic material loaded with graphite or doped silicon, as well as slides having a uniform ITO coating on one or both faces. The latter may possibly be made in a simple manner starting from a mixed solution of indium and tin precursors (for example, in an alcohol or hydro-alcohol solvent) with well-known techniques, such as sol-gel or spray-drying.

The formation of deposits 13 can be achieved using various techniques, in particular those known as Supersonic Cluster Beam Deposition (SCBD) and, among these, in particular the one based on a Pulsed Microplasma Cluster Source (PMCS).

These techniques are known in the production of thin films on a substrate. The PMCS-based SCBD technique is described in various publications, such as the article "Cluster beam deposition: a tool for nanoscale science and technology", K. Wegner et al., Journal of Physics D: Applied Physics 39(22): 439-459, 2006; patent application WO 2011/121017 A1; and chapter "Pulsed microplasma cluster source technique for synthesis of nanostructured carbon films", P. Milani et al., pages 561-564 of book "New trends in intercalation compounds for energy storage", NATO Science Series, vol. 61, 2002.

With the SCBD technique a beam of particles of the material of interest is produced, and the beam is directed, within a reduced pressure chamber, on a support generally arranged orthogonally to the axis of the beam itself.

The shape and size of the deposit (or deposits) 13 is determined with the interposition of a physical mask (typically metal) along the beam and in the proximity of the support; during the deposition, the mask is positioned parallel to the support, generally at a distance of less than 1 mm therefrom. In order to carry out the deposition of the desired material over relatively large areas, such as for example in the case of sample holders with multiple type 13 deposits, or in the case of simultaneous deposition on multiple sample holders, it is possible to carry out a scan of the deposit area, for example by laterally moving the support (and mask) in the plane perpendicular to the beam axis. A same mask may have openings having multiple geometries and/or dimensions, in order deposit sample holders having different configurations in a single deposition session.

After the depositions with the above techniques, deposit 13 is generally hydrophobic.

The hydrophilicity required for the intended applications is imparted to the deposit via UV radiation in air, as described above. By operating according to this preferred mode, deposit 13 can conveniently be made super-hydrophilic, such as by radiation for at least half an hour by means of a 30 W power UV lamp, kept at a distance of about 40 cm from the sample holder of the invention, without having any effect on the original hydrophobicity of the support or affecting the super-hydrophilic nature of the deposits by photo-desorption of volatile compounds from the support. The UV treatment of the sample holder can conveniently and easily be carried out by the operator of the MALDI analysis prior to use the sample holder, using for example an aspirated chemical hood equipped with UV lamp sterilizer, commonly available in any biology laboratory.

The sample holder of the invention has a series of advantages and features that make it particularly suitable and versatile in various MALDI analysis modes.

The inventors have first noted that deposit 13 is able to bind very different biological materials, in particular with respect to their size: from single isolated biomolecules (e.g., peptides and proteins in solution), up to more complex and larger biological entities, such as exosomes, microvesicles, bacteria, or cells. In particular, the inventors have unexpectedly observed that, in the case of exosomes or microvesicles, whose size is in the range of 10-100 nm, the hierarchical structure of the porosity, a consequence of the ballistic growth dynamic of the deposit, has cavities of a size suitable to their capture. In general, the inventors believe that the versatility of the subject sample holder with respect to the capture of very different biological materials comes from the combined effect of nanoporosity at the scales of the size of interest and of the bioaffinity between titanium oxide, and generally of the oxides of Group 4 metals, and the biomolecules present on the membranes of these biological entities (e.g. membrane proteins). In addition, both the oxide and the materials of face 12 or 12' are chemically inert, and allow the in situ treatment of the biological sample, for example with acids or bases. The deposits of oxides of Group 4 metals at the thicknesses at which they are used are substantially transparent, allowing, when deposited on glass slides, optionally coated with ITO, optical microscope analysis before or after the MALDI analysis; these materials are also not self-fluorescent, so as not to overlap a spurious signal to that of the sample in fluorescence-based analyses. Finally, in the common case in which the sample holder has suitably large type 13 deposits, these allow the adhesion of biological tissue sections; this avoids the problem, which occurs with some sample holders of the prior art (and which irremediably leads to the impossibility of using the sample in the MALDI Imaging analysis), of the movement or folding on itself of the histological section as a consequence of washing or treatments with special reagents carried out in situ prior to the analysis (such as, for example, treatment with chloroform for the delipidation of a tissue), or even subsequent to this (for example, treatment with methanol solutions for the removal of the matrix). Surprisingly, the inventors have observed that the adhesion of the tissue to the deposit offers an unexpected advantage, particularly relevant with respect to the problem, commonly known in the MALDI practice on histological samples (MALDI Imaging), of the variation in the planar dimensions of the histological sections as a result of in situ treatments. This problem consists in a slight expansion or contraction of the planar dimensions of the tissue, which makes it difficult to superimpose MALDI images with optical images of the tissue, obtained for example by an optical scanner, if between the ones and the others there have been, as is common, treatments of the sample. Experts of the field currently seek to overcome this drawback through the use of software algorithms applied to the images, which act by altering the dimensions thereof. Due to the improved adhesion of the tissue, the use of the sample holder of the present invention prevents the variation of the planar dimensions of the histological sections following in situ treatments and makes image processing operations superfluous, with advantages in terms of results analysis time, as well as with regard to the risk of introducing artifacts due to processing of the images.

The improvement of the adhesion of the histological sections also assumes particular importance in the use of the MALDI technique for pharmacokinetic studies, whose purpose is the identification of the spatial distribution of a drug (or its active ingredient or one or more of its metabolites, or one of its components) within a tissue. In this application of the MALDI technique, unlike what is illustrated above, no chemical treatment of the tissue can be made: any treatment would in fact cause the elution of the test compounds and the consequent loss of information on their spatial distribution in the tissue. As the use of special reagents (such as chloroform) can cause the detachment of the histological section and the consequent uselessness of the sample, also the total absence of treatments, such as imposed in the MALDI experiments of pharmacokinetics, makes the sample particularly fragile: any assays subsequent to the MALDI analysis performed on the same sample (for example, immunohistochemistry staining) can easily lead to the detachment of the histological section and consequent loss of the sample. This problem is instead solved by the sample holder of the present invention, in which the adhesion of the histological section is substantially improved by the presence of the porous oxide.

Figure 4:
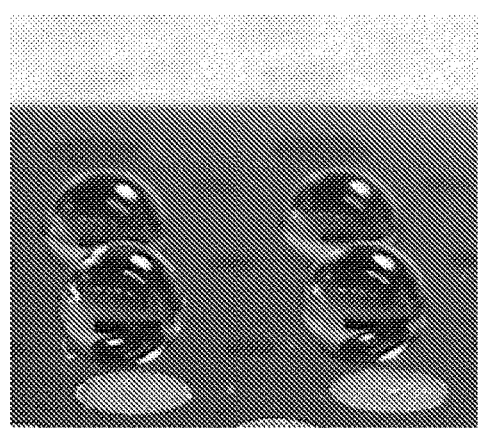
FIG. 4 shows a photograph of a sample holder of the invention in which, on the deposits of metallic oxide, drops of aqueous solution were deposited.

With further reference to the use of the sample holder of the invention, the hydrophilicity of deposits 13 and the hydrophobicity of the surrounding surface of face 12 or 12' allows precisely and uniformly attracting and locating on deposits 13 the drops of aqueous solution containing the species to be analyzed, even when the dispensing of the liquid is not very precise. Also, thanks to the hydrophilicity of deposits 13 and the hydrophobicity of the surrounding area, the drops of solution will concentrate on the deposits also in case of relatively high amounts of liquid, without the need for any raised areas or other containment structures around the deposits themselves; this effect is shown in FIG. 4, in which drops of water-based solution are shown, whose imprint on the sample holder remains confined within deposits 13 despite the large volume of the drop; the same volume, without the confinement given by the hydrophilic-hydrophobic discontinuity, would occupy a much larger area. Likewise, any drops of reagent solution are also confined to the area of deposits 13 for the in situ treatment of biological samples previously deposited on the same areas. Unexpectedly, it has been observed that the confinement given by the hydrophobic barrier around the hydrophilic surface is effective to the point of allowing mechanical actions on the drop itself, such as handling, by manual pipettor or automated liquid-handling systems, of a suitable volume of water back and forth, tens of times, in order to carry out the washing of the sample previously absorbed on the hydrophilic porous oxide (for example, for the removal of salt residues, a consequence of protein samples preparation).

Finally, the inventors have found an unexpected advantage provided by the sample holder due to the peculiar minimum roughness of the porous oxide deposit and correlated to the size distribution of nanoparticles used to produce the deposit: this roughness provides a very high density (per unit area of the deposit) of the nucleation centers on which the crystallization of the matrix used in the MALDI technique can be initiated, when the solution containing the matrix itself, present on the deposit, begins to evaporate. This allows obtaining an optimal distribution of MALDI matrix crystals, i.e. a high surface density of small crystals, uniformly distributed over the entire area of deposit 13, which eliminates the problem of the (manual or automatic) search for the most suitable crystal to be irradiated by the laser pulse (in jargon called "hot spot"). The matrix materials may for example be α-cyano-4-hydroxycinnamic acid (generally indicated in the field with the abbreviation CHCA) or sinapic acid (usually abbreviated as SA), in acetonitrile and/or trifluoroacetic acid solutions in water. It is possible to quantify the minimum peculiar roughness of the porous oxide deposit correlated to the size distribution of the nanoparticles used to produce the deposit by means of atomic force microscopy (AFM) measurements on deposits consisting of a single monolayer of nanoparticles. The method is described in section II.B of the article by Podestà et al. mentioned above. At a series of measurements carried out by the inventors on deposits consisting of a single monolayer of nanoparticles, the minimum rms roughness of the oxide deposits formed on the supports was found to be about 3-5 nm. It is also possible to estimate the number of nucleation centers per unit area, imagining a monolayer of spherical particles of 10 nm diameter (therefore, between 5 and 15 nm) and assuming that each nanoparticle constitutes a nucleation center. In these assumptions, it is found that the number of nucleation centers is greater than $1 \times 10^{10}$ per square millimeter. The three-dimensional development of the nano-porous film for thicknesses higher than the monolayer further increases the number of nucleation centers for geometric unit area.

After being activated by exposure to UV in the simple manner described above, the sample holder of the invention can be used in the preparation for MALDI analysis according to various possible protocols, such as for example those exemplified below; all the drops of sample solutions or of calibration standards have a volume in the order of magnitude of microliters.

Protocol 1—Basic Procedure 1.a) Pipetting a drop of the biological sample to be analyzed on a deposit 13 of the sample holder of the invention;
1.b) waiting for the drop to dry;
1.c) pipetting a drop of a MALDI matrix solution, such as SA or CHCA, on the same area of point 1.a;
1.d) waiting for the drying of the drop;
1.e) pipetting a drop of solution of a calibration standard in a dedicated type 13 deposit of the sample holder;
1.f) waiting for the drying of the drop;
1.g) if the calibration standard solution of point 1.e not is not already provided with the MALDI matrix, pipetting a drop of a MALDI matrix solution, such as SA or CHCA and waiting for the drying of the same.

Protocol 2—Procedure with Sample Washing 2.a) Pipetting a drop of the biological sample to be analyzed on a deposit 13 of the sample holder of the invention;
2.b) waiting for the drying of the drop;
2.c) washing the sample (for example for removal of the salt) by pipetting a drop of water on the same area of point 2.a, and moving the plunger of the pipette forward and backward; then, eliminating the drop of water;
2.d) repeating step 2.c at least once;
2.e) pipetting a drop of a MALDI matrix solution, such as SA or CHCA, on the same area of point 2.a;
2.f) waiting for the drying of the drop;
2.g) pipetting a drop of solution of a calibration standard in a dedicated type 13 deposit of the sample holder;
2.h) waiting for the drying of the drop;
2.i) if the calibration standard solution of point 2.g not is not already provided with the MALDI matrix, pipetting a drop of a MALDI matrix solution, such as SA or CHCA and waiting for the drying of the same.

Protocol 3—Procedure with Chemical Treatment of the Sample 3.a) Pipetting a drop of the biological sample to be analyzed on a deposit 13 of the sample holder of the invention;
3.b) waiting for the drying of the drop;
3.c) chemically treating the sample by pipetting a drop of an aqueous solution of a suitable reagent (e.g. ethanol for the dehydration of the sample) on the same area of point 3.a, and moving the plunger of the pipette forward and backward; then, discarding the drop of aqueous solution;
3.d) repeating step 3.c at least once;
3.e) pipetting a drop of a MALDI matrix solution, such as SA or CHCA, on the same area of point 3.a;
3.f) waiting for the drying of the drop;
3.g) pipetting a drop of solution of a calibration standard in a dedicated type 13 deposit of the sample holder;
3.h) waiting for the drying of the drop;
3.i) if the calibration standard solution of point 3.g not is not already provided with the MALDI matrix, pipetting a drop of a MALDI matrix solution, such as SA or CHCA and waiting for the drying of the same.

Protocol 4—Procedure with Enzymatic Treatment of the Sample 4.a) Pipetting a drop of the biological sample to be analyzed on a deposit 13 of the sample holder of the invention;
4.b) waiting for the drying of the drop;
4.c) performing the enzymatic digestion of the sample by pipetting a drop of the enzyme in the digestion buffer (e.g. trypsin in ammonium bicarbonate) over the same area of point 4.a; then, incubating at a suitable temperature and for a suitable time (such as 50° C. for 30 minutes), preferably in a closed volume in order to limit the evaporation of the buffer;
4.d) waiting for the drying of the drop;
4.e) pipetting a drop of a MALDI matrix solution for peptides, such as CHCA, on the same area of point 4.a;
4.f) waiting for the drying of the drop;
4.g) pipetting a drop of solution of a calibration standard in a dedicated type 13 deposit of the sample holder;
4.h) waiting for the drying of the drop;
4.i) if the calibration standard solution of point 4.g not is not already provided with the MALDI matrix, pipetting a drop of a MALDI matrix solution, such as SA or CHCA and waiting for the drying of the same.

Protocol 5—Procedure for Pre- and Post-Enzymatic Treatment Measurements 5.a) After carrying out any one of protocols 1 to 3 and after collecting the MALDI analysis data, removing the MALDI matrix by pipetting a drop of an aqueous solution of methanol on the same area being analyzed, moving the plunger of the pipette forward and backward; then, discarding the drop of aqueous solution;
5.b) performing the enzymatic digestion of the sample by pipetting a drop of the enzyme in the digestion buffer (e.g. trypsin in ammonium bicarbonate) over the same area of point 5.a; then, incubating at a suitable temperature and for a suitable time (such as 50° C. for 30 minutes), preferably in a closed volume in order to limit the evaporation of the buffer;
5.c) waiting for the drying of the drop;
5.d) pipetting a drop of a MALDI matrix for peptides, such as CHCA, on the same area of point 5.a;
5.e) waiting for the drying of the drop.

Protocol 6—Procedure for Preparing the Sample for Molecular Histology Measurements (MALDI Imaging) for Pharmaco-Kinetics 6.a) Cutting a cryo-preserved tissue section using a cryo-microtome and placing it on a sample holder of the invention, at at least one type 13 deposit of appropriate size;

6.b) mounting the tissue through thawing (for example by the heat of a finger placed on the back of the sample holder) and allowing it to adhere on the surface of the sample holder;

6.c) pipetting a drop of solution of a calibration standard not including the MALDI matrix in a dedicated type 13 deposit of the sample holder;

6.d) waiting for the drying of the drop;

6.e) with the aid of dedicated instrumentation (such as a Bruker Immagine Prep instrument), atomizing a MALDI matrix solution for proteins/peptides, such as SA or CHCA, at least in the areas defined in points 6.a and 6.c;

6.f) waiting for the drying of the matrix.

Protocol 7—Procedure for the In Situ Preparation and Treatment of the Sample for Molecular Histology Measurements (MALDI Imaging) for Proteomics 7.a) Cutting a cryo-preserved tissue section using a cryo-microtome and placing it on a sample holder of the invention, at at least one type 13 deposit of appropriate size;

7.b) mounting the tissue through thawing (for example by the heat of a finger placed on the back of the sample holder) and allowing it to adhere on the surface of the sample holder;

7.c) treating the tissue section with suitable chemicals, such as ethanol for dehydration, acetone for fixation or chloroform for delipidation;

7.d) pipetting a drop of solution of a calibration standard not including the MALDI matrix onto a dedicated type 13 deposit of the sample holder;

7.e) waiting for the drying of the drop;

7.f) with the aid of dedicated instrumentation (such as a Bruker Immagine Prep instrument), atomizing a MALDI matrix solution for proteins/peptides, such as SA or CHCA, at least in the areas defined in points 7.a and 7.d;

7.g) waiting for the drying of the matrix.

Protocol 8—Procedure for Sequential Analysis MALDI and Immunohistochemistry 8.a) After carrying out any one of protocols 6 or 7, and after collecting the MALDI analysis data, removing the MALDI matrix, such as by means of weak sonication in an aqueous solution of methanol;

8.b) waiting for the drying of the sample thus removed;

8.c) performing an immunohistochemistry (IHC), or any generic staining assay of the sample (for example, hematoxylin).

As will be apparent to those skilled in the art, other protocols are also possible, for example derived from combinations of the eight protocols described above; the MALDI sample holders of the invention are suitable for performing all of these protocols in automated form, with a robotic platform for the handling of liquid samples and treatment solutions, allowing the analysis of a large number of samples per unit of time to be performed. In order to employ automated procedures, the sample holder of the invention may be mounted on a suitable adapter allowing the stable insertion thereof into the sample chamber of a mass spectrometer.

The invention will be further described by the following experimental section.

EXAMPLE 1

This example relates to the production and characterization of a first sample holder for MALDI analysis according to the invention.

A polypropylene plate loaded with graphite was used as a support, having a volume resistivity of the order of $3 \times 10^2 \Omega \times$ cm and dimensions of $75 \times 25 \times 1$ (mm).

The support was introduced into the deposition chamber of an apparatus for SCBD depositions. In front of the support, at a distance of 1 mm from this, a physical mask (perforated metal plate) was positioned, having two series of circular apertures of diameter of 1 mm and 2 mm, each having a spacing of 4.5 mm between the centers of the respective circular openings, and mutually offset by 2.25 mm in vertical and horizontal direction.

Through the SCBD technique, at the openings of the mask, nanoporous deposits of $TiO_2$ were obtained on the support, having a thickness of about 200 nm, produced by deposition of nanoparticles generated by PMCS. The main process parameters used were: Argon gas (process gas) line pressure=40 bar, discharge voltage=900 V, discharge duration=60 µs, number of pulses per unit time=4 (repetition rate=4 Hz), nominal opening time of pulsed valve=220 µs, average pressure in the expansion chamber during the process=$2.4 \times 10^{-3}$ mbar, source-support distance=50 cm.

Figure 5A:
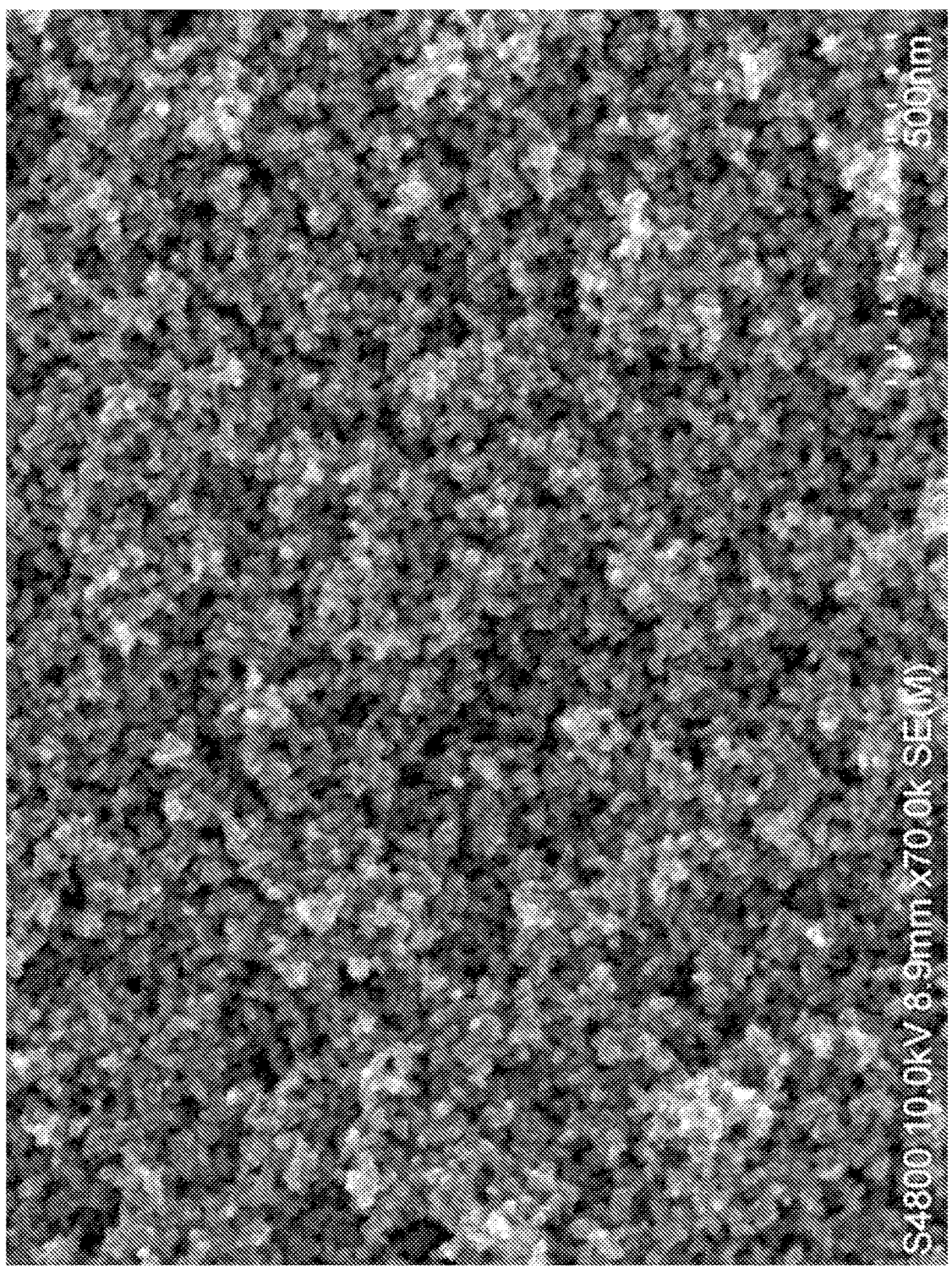
FIGS. 5a and 5b show two microphotographs in different magnifications taken with the scanning electron microscope of the surface of a deposit of metallic oxide present on the sample holder of the invention.
Figure 5B:
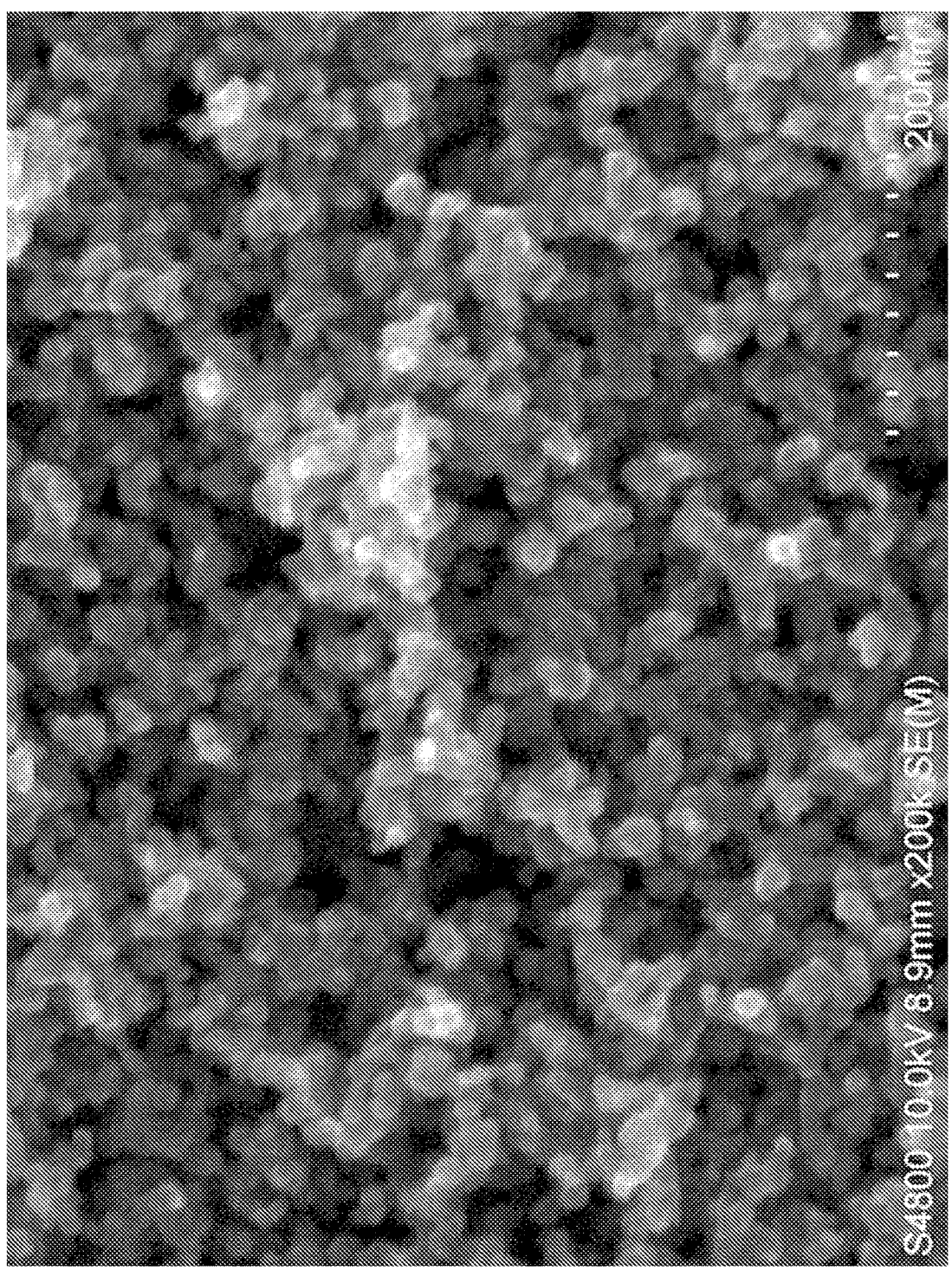

The result of the deposition test is shown in the photograph reproduced in FIG. 3. FIGS. 5*a* and 5*b* show photographs of the surface of a $TiO_2$ deposit obtained by scanning electron microscopy (SEM) at 70,000 and 200,000 magnification, respectively. These photomicrographs show the nanoparticles that make up the deposit and highlight both the nanoporous structure and the porosity hierarchy thereof.

EXAMPLE 2

Figure 6:
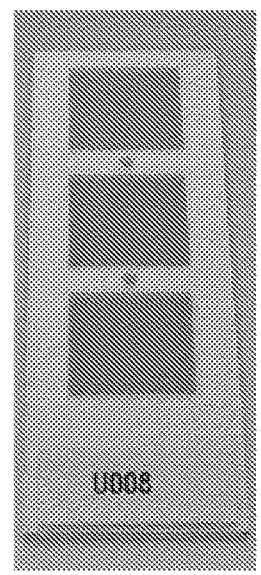
FIG. 6 shows another possible embodiment of a sample holder of the invention.

The procedure of Example 1 was repeated but using in this case, as a support, a glass plate of dimensions of $75 \times 25 \times 1$ (mm) having a surface coating of ITO, which imparts a surface resistance to the support of the order of $100 \Omega \times$ square, and a suitable mask with three square openings of 15 mm side and two circular openings of 2 mm diameter. A sample holder like that shown in FIG. 6 is obtained. The $TiO_2$ deposits, analyzed by SEM, show the same morphological characteristics (particle size of the $TiO_2$ nanoparticles and distribution of porosity) as those in Example 1.

EXAMPLE 3

The sample holder produced as described in Example 1 was used to perform MALDI analyses according to Protocol 5 (procedure for pre- and post-enzymatic treatment measurements), operating on one of the 2 mm diameter deposits present on the sample holder.

A volume of 2 µL BSA (Bovine Serum Albumine) in aqueous solution was pipetted on one of the deposits of the sample holder, waiting for the evaporation of the solvent (Milli-Q water).

Once the evaporation was completed, on the same deposit was pipetted a volume of 1 µl of a solution with saturated concentration of a MALDI matrix precursor for proteins (sinapic acid) in acetonitrile and water in a proportion of 1:2 (volume). It was waited for the evaporation of the solvent and the formation of matrix-sample crystals.

Figure 7:
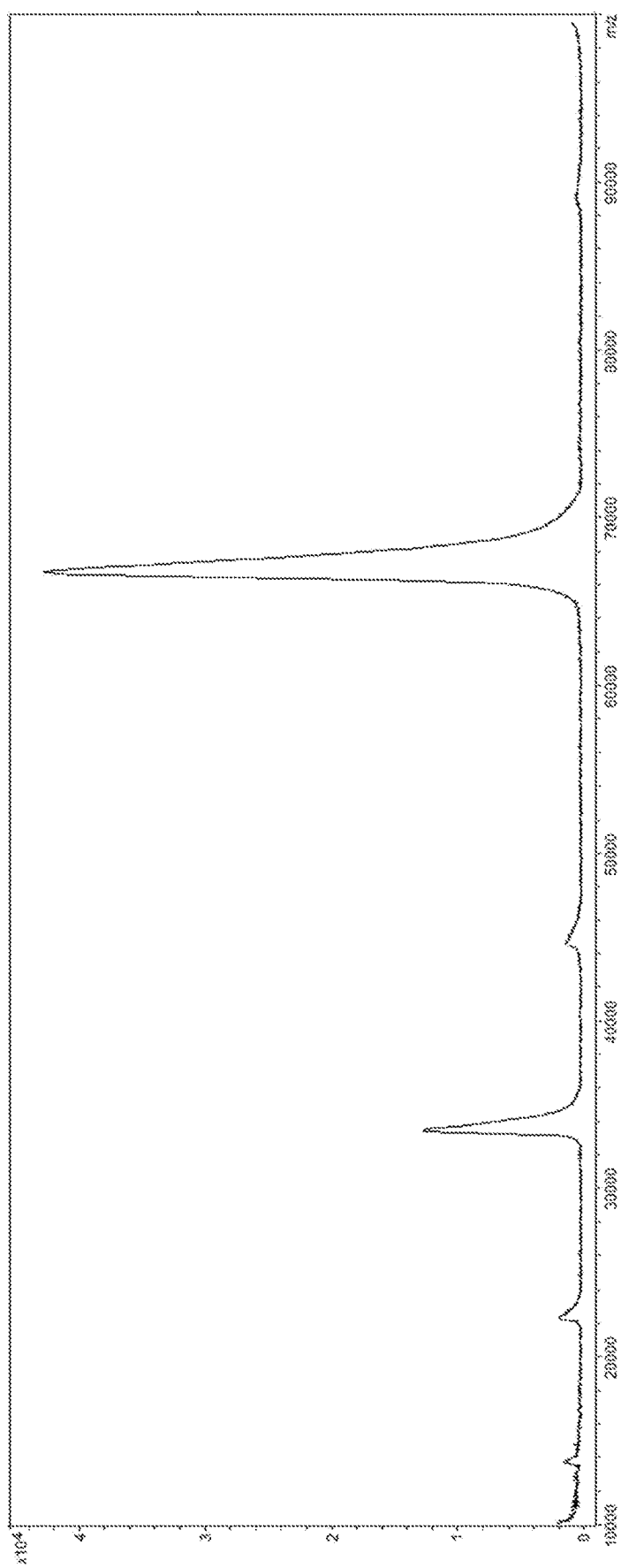
FIGS. 7 and 8 show two mass spectra made with the MALDI technique using a sample holder of the invention, before and after in situ treatment of the sample, respectively.

The sample holder thus prepared was introduced into the MALDI mass spectrometer (Bruker UltrafleXtreme) and the signal produced by the BSA sample was acquired; the test result is shown in FIG. 7.

The sample holder was then extracted from the spectrometer and the removal of the crystallized MALDI matrix was performed by in-situ washing with 2 μl of a methanol solution at 70% by volume in water.

The enzymatic digestion of the sample was then carried out by pipetting a volume of 5 μl of an aqueous solution of ammonium bicarbonate 40 mM (buffer) to which was added a volume of 1 μl of aqueous solution of Trypsin at a concentration of 0.05 μg/μl. The sample holder thus treated was maintained for about 30 minutes at a temperature of 45-50° C. in a closed volume (to limit the evaporation of the buffer).

After incubation, it was waited for the complete evaporation of the residual volume of ammonium bicarbonate buffer in water.

After complete evaporation, on the same deposit was pipetted a volume of 1 μl of a saturated concentration solution of MALDI matrix precursor for peptides (CHCA) in acetonitrile and water in proportions of 1:2 (by volume). It was waited for the evaporation of the solvent and the formation of matrix-sample crystals.

Figure 8:
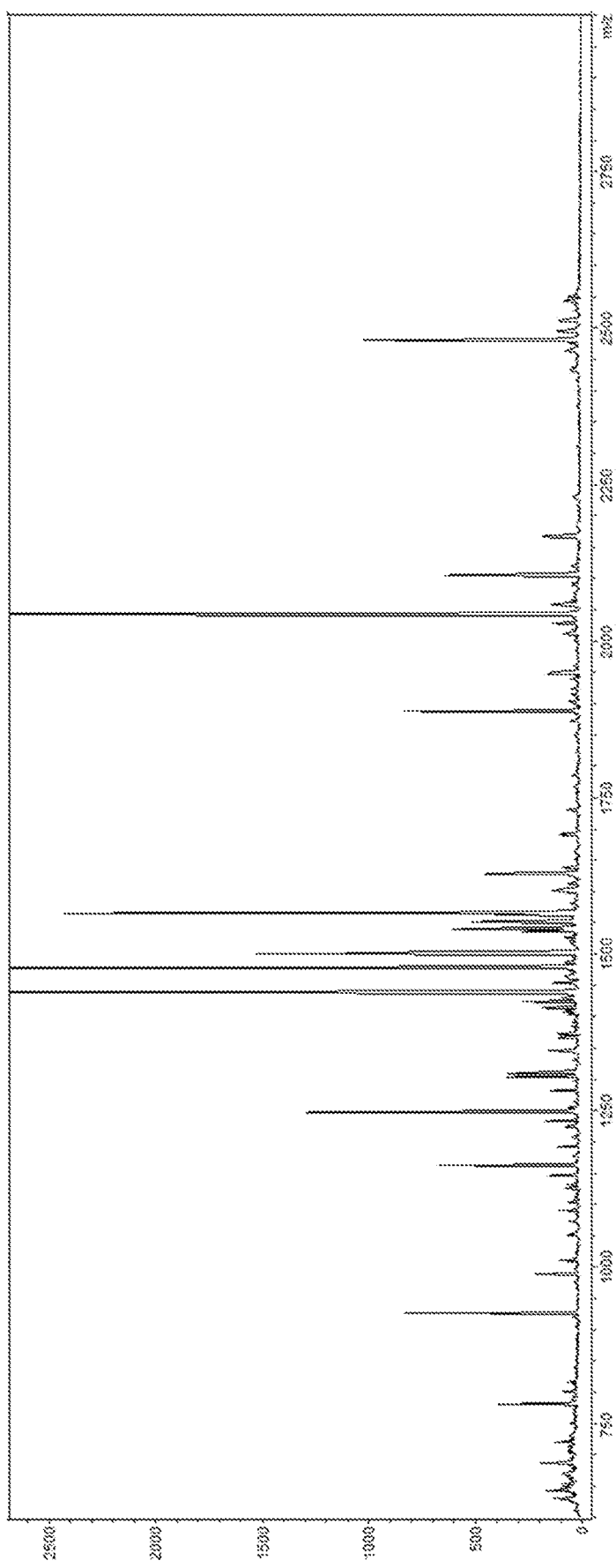

The sample holder thus prepared was again introduced into the MALDI mass spectrometer and the signal produced by the peptides generated by the enzymatic digestion of the BSA sample was acquired. The test result is shown in the spectrum in FIG. 8.

The invention claimed is:

1. A sample holder for use in the MALDI technique, comprising:
    a support, selected from:
        a) a support made from a non-elastomeric polymer loaded with graphitic carbon (carbon-black filled), having a volume resistivity lower than $10^{12} \Omega \times cm$ and a contact angle in a water wettability measurement at least equal to 90°;
        or
        b) a support having at least one face covered with a layer of a non-elastomeric polymer loaded with graphitic carbon (carbon-black filled), having a surface resistivity lower than 10 k$\Omega \times$square and a contact angle in a water wettability measurement at least equal to 90°;
    on a face of the support in case a) or on said covered face in case b), one or more deposits of an oxide of a metal of Group 4 of the periodic table of the elements, having a thickness between 100 and 400 nm and consisting of nanoparticles of said oxide having size between 2 and 50 nm, said one or more deposits entirely surrounded by the polymer of the support in case a) or by the polymer of said layer in case b);
    wherein said one or more oxide deposits are obtained by ballistic growth from said nanoparticles and have a self-affine structure, which has a porosity hierarchy from one nanometer to one hundred of nanometers;
    and wherein the surface of the sample holder on which there are said one or more oxide deposits is treated with UV radiation in such a way that the deposits show a contact angle smaller than 5° to a water wettability measurement while the same treatment with UV radiation does not alter the hydrophobicity of the support in case a) or of the polymer of said layer in case b).

2. The sample holder according to claim 1, wherein said deposits have a thickness between 150 and 300 nm, and the particle-size distribution curve of the oxide nanoparticles forming them has a maximum in the range between 5 and 15 nm.

3. The sample holder according to claim 1, wherein said one or more deposits of an oxide of a metal of Group 4 of the periodic table of the elements have, at a measurement with an atomic force microscope (AFM), a minimum rms roughness between 3 and 5 nm.

4. The sample holder according to claim 1, wherein said one or more deposits of an oxide of a metal of Group 4 of the periodic table of the elements have a density of nucleation centers higher than $1 \times 10^{10}$ per square millimeter.

5. The sample holder according to claim 1, wherein said non-elastomeric polymer loaded with graphitic carbon (carbon-black filled) of said support or of said layer is selected among polypropylene, polyethylene, polystyrene, poly(methyl methacrylate) and polycarbonate.

6. The sample holder according to claim 1, wherein there is a plurality of deposits of oxide of a metal of Group 4 in an ordered geometric arrangement, and preferably centered at the nodes of a square lattice with a spacing corresponding to the standard adopted in multiwell plates.

7. The sample holder according to claim 1, wherein on the same face there are deposits of oxide of a Group 4 metal and deposits, generally made with the same oxide but having different size, for the positioning on the sample holder of internal calibration standards of MALDI analysis.

8. The sample holder according to claim 1, having lateral dimensions of 25×75 mm and a thickness of 1 mm.

9. The sample holder according to claim 1, wherein said oxide of a metal of Group 4 of the periodic table of the elements is titanium oxide, $TiO_2$.

10. A process for the production of a sample holder of claim 1, comprising the following steps:
    obtaining a support consisting of a non-elastomeric polymer loaded with graphitic carbon (carbon-black filled), having a volume resistivity lower than $10^{12} \Omega \times cm$ and a contact angle in a water wettability measurement at least equal to 90°;
    or
    obtaining a support having at least one face covered with a layer of a non-elastomeric polymer loaded with graphitic carbon (carbon-black filled), having a surface resistivity lower than 10 k$\Omega \times$square and a contact angle in a water wettability measurement at least equal to 90°;
    positioning in the vicinity of the support, between this and the source of the material to be deposited on the same, a physical mask having one or more openings having geometry corresponding to one or more deposits of an oxide of a Group 4 metal which are intended to be formed on the support, turning towards said source the face covered with said layer in the case of support with a covered face;
    depositing with the Supersonic Cluster Beam Deposition (SCBD) technique, on a face of the support in case a) or on said covered face in case b), one or more deposits of an oxide of a metal of Group 4 of the periodic table of the elements, consisting of nanoparticles of said oxide of dimensions ranging between 2 and 50 nm and having a thickness between 100 and 400 nm, entirely surrounded by the polymer of the support in case a) or by the polymer of said layer in case b), forming a self-affine porous structure having a hierarchy of porosity from one nanometer to one hundred of nanometers;

treating the surface of the sample holder on which there are said one or more deposits by UV radiation, to impart to said deposits a contact angle of less than 5° at a wettability measurement while preserving the hydrophobicity features of the surrounding support.

11. The process according to claim 10, wherein the Supersonic Cluster Beam Deposition technique adopted is based on a Pulsed Microplasma Cluster Source (PMCS).

12. The process according to claim 10, wherein the Group 4 metal oxide deposit is made hydrophilic by irradiation for more than half an hour with a 30 W power UV lamp, kept at a distance of about 40 cm from said one or more deposits.

* * * * *